US009489599B2

(12) United States Patent
Chen et al.

(10) Patent No.: US 9,489,599 B2
(45) Date of Patent: Nov. 8, 2016

(54) DECISION TREE CONSTRUCTION FOR AUTOMATIC CLASSIFICATION OF DEFECTS ON SEMICONDUCTOR WAFERS

(71) Applicant: KLA-Tencor Corporation, Milpitas, CA (US)

(72) Inventors: Chien-Huei (Adam) Chen, San Jose, CA (US); Chris Maher, Tracy, CA (US); Patrick Huet, San Jose, CA (US); Tai-Kam Ng, San Jose, CA (US); John Raymond Jordan, III, Mountain View, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 14/257,921

(22) Filed: Apr. 21, 2014

(65) Prior Publication Data

US 2015/0125064 A1 May 7, 2015

Related U.S. Application Data

(60) Provisional application No. 61/899,220, filed on Nov. 3, 2013, provisional application No. 61/972,418, filed on Mar. 31, 2014.

(51) Int. Cl.
*G06K 9/00* (2006.01)
*G06K 9/62* (2006.01)
*G06T 7/00* (2006.01)

(52) U.S. Cl.
CPC ........... *G06K 9/6285* (2013.01); *G06K 9/6282* (2013.01); *G06T 7/0004* (2013.01)

(58) Field of Classification Search
CPC .... G06K 9/6285; G06K 9/62; G06T 7/0004; G06T 7/00
USPC ........................................................ 382/149
See application file for complete search history.

(56) References Cited

U.S. PATENT DOCUMENTS

| | | |
|---|---|---|
| 6,148,099 A | 11/2000 | Lee et al. |
| 6,922,482 B1 * | 7/2005 | Ben-Porath .................. 382/149 |
| 8,233,494 B2 | 7/2012 | Amini et al. |
| 8,315,453 B2 | 11/2012 | Shlain et al. |
| 8,437,534 B2 | 5/2013 | Shibuya et al. |
| 8,502,146 B2 | 8/2013 | Chen et al. |
| 2004/0218806 A1 | 11/2004 | Miyamoto et al. |
| 2012/0155741 A1 | 6/2012 | Shibuya et al. |
| 2013/0082174 A1 | 4/2013 | Chen et al. |
| 2013/0202189 A1 | 8/2013 | Shibuya et al. |
| 2014/0133737 A1 | 5/2014 | Plihal et al. |

OTHER PUBLICATIONS

International Search Report and Written Opinion for PCT/US2014/063668 mailed on Jan. 29, 2015.
Hunt et al., "Paradigm for selecting the optimum classifier in semiconductor automatic defect classification applications," Metrology, Inspection, and Process Control for Microlithography XIV, Proceedings of SPIE vol. 3998 (2000), pp. 269-276.

\* cited by examiner

*Primary Examiner* — Ruiping Li
(74) *Attorney, Agent, or Firm* — Ann Marie Mewherter

(57) ABSTRACT

Methods and systems for decision tree construction for automatic classification of defects on semiconductor wafers are provided. One method includes creating a decision tree for classification of defects detected on a wafer by altering one or more floating trees in the decision tree. The one or more floating trees are sub-trees that are manipulated as individual units. In addition, the method includes classifying the defects detected on the wafer by applying the decision tree to the defects.

33 Claims, 4 Drawing Sheets

DECISION TREE CONSTRUCTION FOR AUTOMATIC CLASSIFICATION OF DEFECTS ON SEMICONDUCTOR WAFERS

BACKGROUND OF THE INVENTION

1. Field of the Invention

This invention generally relates to decision tree construction for automatic classification of defects on semiconductor wafers.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

Automatic defect classification (ADC) of semiconductor defects is an important application of scanning electron microscope (SEM) review tools. One of the commonly used methods in the industry for performing this task are decision trees. For example, U.S. Pat. No. 8,502,146 to Chen et al., which is incorporated by reference as if fully set forth herein, describes a very effective ADC system using surface height attributes. An example is illustrated in FIG. 1, in which a simple decision tree classifier using two effective attributes can distinguish four types of defects. In particular, in rule based tree 100, first node 102 separates the defects based on topographical ("topo") height. For example, as shown in histogram 104 for the topographical heights of defects detected on a wafer, cut line 106 for the first node separates void and scratch defect types from particle and cone defect types. The void and scratch defect types can be sent to node 108, which as shown in histogram 110 for the sizes of the defects, cut line 112 separates void defects from other defects, cut line 114 separates scratch defects from other defects, and defects falling between cut lines 112 and 114 can be separated into another bin for undecided defect types. In this manner, the void defect types can be put into bin 116, the scratch defect types can be put into bin 118, and the undecided defect types can be put into bin 120. Node 122 can be used to separate the particle and cone defect types in a similar manner using some characteristic of the particle and cone defect types. As such, the decision based tree shown in FIG. 1 splits classification into a series of easy and logical steps that can be performed for decision tree-based ADC.

Although the concept of decision trees is very simple to understand, manual construction of decision tree classifiers for practical applications is not simple at all. There are three major drawbacks in the traditional decision tree model. First, the complexity of the decision tree grows substantially quickly with the number of defect types to be classified. For example, an effective decision tree for more than ten defect types typically requires more than ten levels and hundreds of nodes, thereby becoming extremely difficult to build and manage manually. Therefore, intuitively simple decision trees become extremely complicated with increasing number of bins. Second, it is impossible to tune the performance (e.g., either accuracy or purity) of a decision tree for one defect type without affecting the performance of the decision tree for other defect types. Similarly, decision trees are difficult to maintain since tweaking one defect type can affect other defect types. Third, since the population is split by each node, the lower nodes have less and less population for deciding appropriate cut lines between types. There are, therefore, a number of drawbacks to ADC setup today.

One obvious solution to the difficulty of manual classifier construction is to algorithmically construct the classifiers automatically. Such automatic construction is actually a major research area in artificial intelligence (AI) and data mining, and there has been a long history of published results in this area. One of the most prominent examples is classification and regression trees (CART), which is commercially available in software products from Salford Systems, San Diego, Calif. In fact, the IMPACT software that is commercially available from KLA-Tencor, Milpitas, Calif. already has a feature called "starter-tree" that can automatically generate decision tree classifiers. However, in some instances, classifiers generated by automatic methods may over-fit the data and therefore in general may not be stable. Furthermore, the resulting classifiers are still one decision tree to classify all types, thereby still suffering from the second and third problems mentioned above. In addition, when decision tree based ADC causes every defect to be classified, the user has to go to extra lengths to leave room for unknown defect types (which is rarely done).

Accordingly, it would be advantageous to develop methods and/or systems for defect classification-related applications that do not have one or more of the disadvantages described above.

SUMMARY OF THE INVENTION

The following description of various embodiments is not to be construed in any way as limiting the subject matter of the appended claims.

One embodiment relates to a method for classifying defects detected on a wafer. The method includes creating a decision tree for classification of defects detected on a wafer by altering one or more floating tree in the decision tree. The one or more floating trees are sub-trees that are manipulated as individual units. The method also includes classifying the defects detected on the wafer by applying the decision tree to the defects. The creating and classifying steps are performed by one or more computer systems.

The method described above may be performed as described further herein. In addition, the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for classifying defects detected on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a wafer inspection tool. The wafer inspection tool includes an optical subsystem configured to scan at least a portion of a wafer thereby generating output responsive to light from at least the portion of the wafer. The wafer inspection tool also includes a computer subsystem configured for detecting defects on the wafer based on the output. The computer subsystem is also configured for creating a decision tree for classification of the defects by altering one or more floating trees in the decision tree. The one or more floating trees are sub-trees that are manipulated as individual units. In addition, the computer subsystem is configured for classifying the defects detected on the wafer by applying the decision tree to the defects. The wafer inspection tool may be further configured as described herein.

BRIEF DESCRIPTION OF THE DRAWINGS

Other objects and advantages of the invention will become apparent upon reading the following detailed description and upon reference to the accompanying drawings in which.

Figure 1:
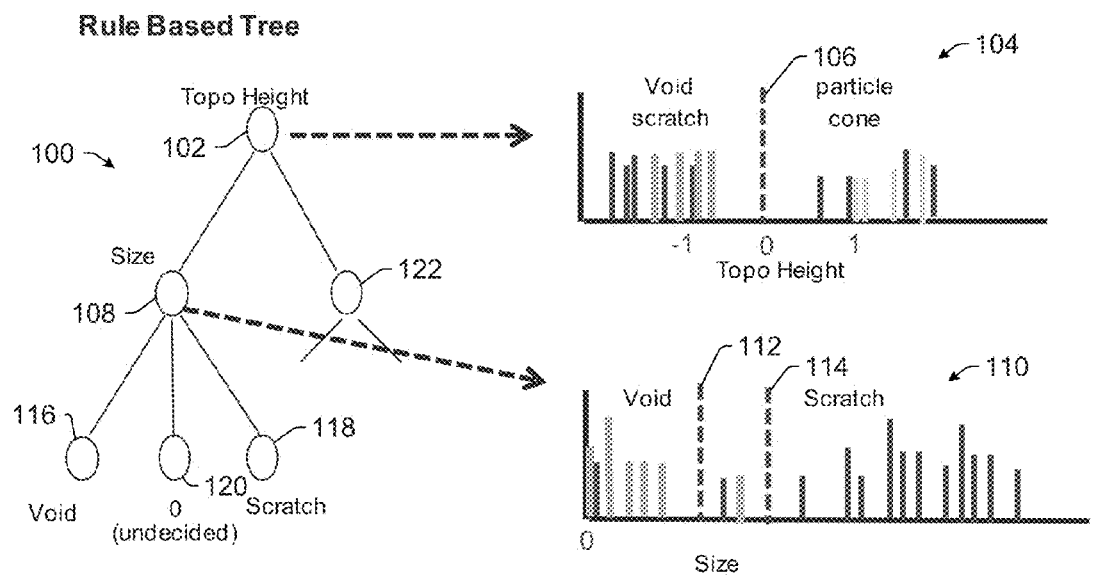
FIG. 1 is a schematic diagram illustrating one example of a decision tree classifier currently used in the art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

The embodiments described herein generally relate to methods and systems for constructing decision trees for automatic classification of defects of semiconductor wafers. The embodiments described herein can be used to simplify the manual construction of decision tree based automatic defect classifiers (ADCs) for semiconductor wafers, to improve the performance of such decision tree based ADCs, to improve the performance of tuning and/or maintenance of such decision tree based ADCs, and to improve the performance of monitoring of such decision tree based ADCs.

One embodiment relates to a method for classifying defects detected on a wafer. The method includes creating a decision tree for classification of defects detected on a wafer by altering one or more floating trees in the decision tree. The one or more floating trees are sub-trees that are manipulated as individual units. The embodiments described herein therefore introduce the notion of floating trees, which basically are any sub-tree in a decision tree that can be manipulated as a unit. The floating trees can be cut, copied, moved, or pasted from one node of a tree to another node of a tree. In this manner, in one embodiment, altering the one or more floating trees includes cutting, copying, pasting, or moving the one or more floating trees from one node of the decision tree to another node of the decision tree. The embodiments described herein may also be configured such that a user can delete a floating tree.

Figure 2:
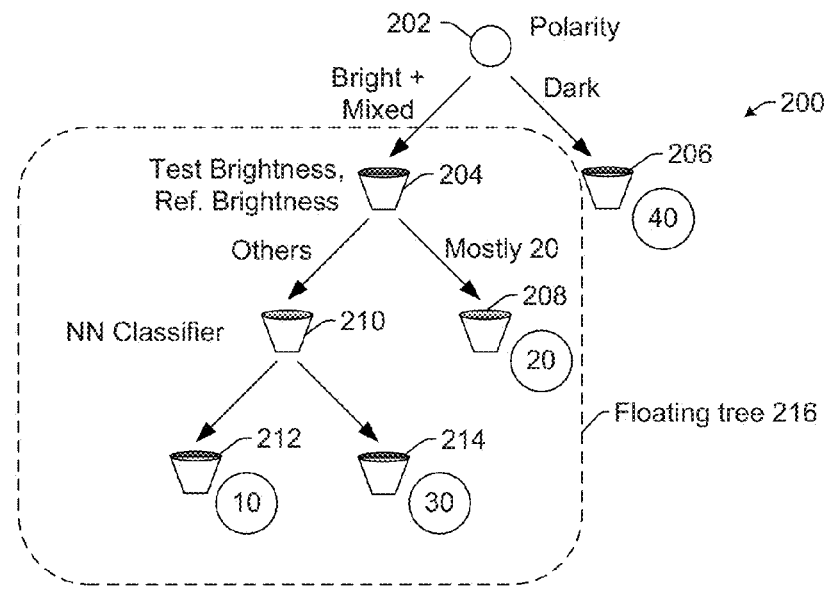
FIG. 2 is a schematic diagram illustrating one embodiment of a decision tree that includes a floating tree.

FIG. 2 illustrates one embodiments of a decision tree that includes a floating tree. In particular, as shown in FIG. 2, decision tree 200 may include node 202 that is configured to separate defects based on polarity. More specifically, the node may separate the defects into bin 204 that includes defects that have polarities that are bright and mixed and bin 206 that includes defects that have polarities that are dark. As shown in FIG. 2, bin 206 includes 40 defects. The defects included in bin 204 may then be separated based on the test brightness, ref. (or reference) brightness characteristics of the defects (or the brightness of the test image corresponding to the defect and the brightness of the reference image that was compared with the test image for defect detection). For example, the defects that have a test brightness, ref. brightness of mostly 20 may be separated into bin 208 that includes 20 defects as shown in FIG. 2. In addition, the defects that have a test reference, ref. brightness of other values may be separated into bin 210. A nearest neighbor (NN) classifier may then be applied to the defects included in bin 210. The defects may then be separated into bin 212 and bin 214, that include 10 defects and defects, respectfully, as shown in FIG. 2. As further shown in FIG. 2, the portion of the decision tree for the bright+mixed polarity defects may be configured as floating tree 216, which may be further configured as described herein. In addition the portion of the decision tree for the dark polarity defects may not be configured as a floating tree. Therefore, some portions of decision trees may be floating trees while other portions of the decision trees may not be floating trees.

In another embodiment, the method includes collapsing at least one of the one or more floating trees into at least one aggregated node during the creating step. The embodiments described herein may provide the ability to collapse or expand a sub-tree from any node. In addition, the floating trees can be collapsed (hidden) into "aggregated" nodes so that the clutter in the workspace of decision tree construction can be reduced. In this manner, a benefit of the embodiments described herein is that they can be used to save real estate and remove clutter in the decision tree construction user interface (UI).

In a further embodiment, the method includes collapsing at least one of the one or more floating trees into at least one aggregated node during the creating step, and the collapsing includes collapsing all leaf nodes included in the at least one floating tree into the at least one aggregated node. For example, in a floating tree, the leaf nodes of the floating tree that belong to the same code (including code 0, unassigned) are aggregated into one node when it's collapsed.

Figure 3:
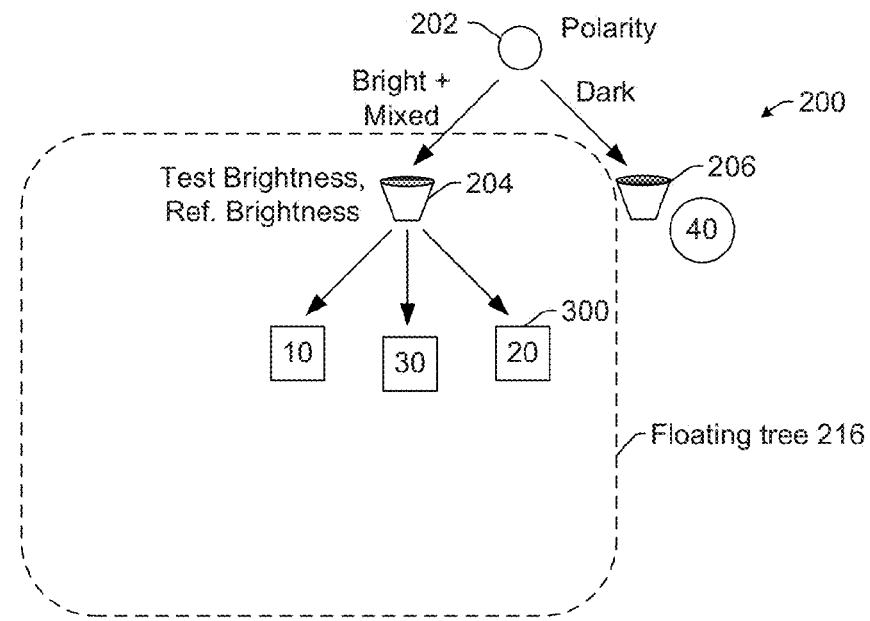
FIG. 3 is a schematic diagram illustrating the decision tree embodiment shown in FIG. 2 with the floating tree collapsed.

In one such embodiment, the floating tree portion of the decision tree shown in FIG. 2 can be collapsed, as shown in FIG. 3. For example, as shown in FIG. 3, floating tree 216 has been collapsed to shown only one representative node 204 for the floating tree as well as the defect counts 300 that are included in each of the different bins produced by the floating tree. When a floating tree has been collapsed, a plus sign icon ("+") may be displayed in a UI to indicate that the tree has been collapsed at that particular node. If a floating tree has been collapsed, it can also be expanded such that the entire floating tree can be displayed in a UI. In some instances, a floating tree can be locked. For example, a floating tree can be configured such that it can only be expanded with a key for the purpose of intellectual property protection.

In an additional embodiment, altering the one or more floating trees includes importing at least one of the one or more floating trees from at least one file in which the at least one floating tree is saved. For example, the floating trees can also be saved in a file and imported and used in other decision trees. In addition, a floating tree can be imported from a file and attached to any nodes of a decision tree.

In one embodiment, at least one of the one or more floating trees is a binner for a single class of defects. For example, using the capability of floating trees, one can build a decision tree for just one type of defects at a time and store it as a floating tree. A user may also create any number of such trees (e.g., as many trees as there are defect types). Such floating trees can be referred to as single class binners (SCBs). In this manner, an SCB that is implemented as a floating tree can be used to classify a single defect type (in other words, separating the single type from all other types). Different SCBs can then be combined to form a complete decision tree that can classify many types of defects. In this manner, a decision tree created as described herein may include more than one floating tree. Therefore, the decision trees may be classifiers containing multiple floating trees.

Figure 4:
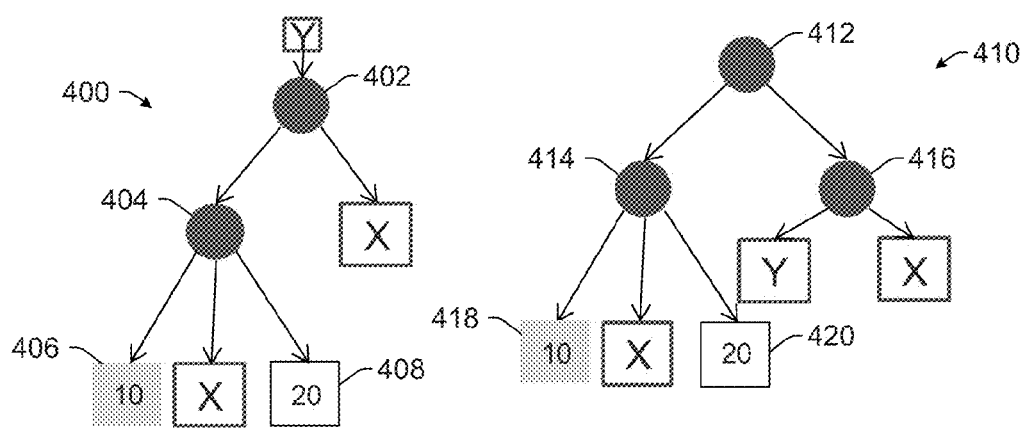
FIG. 4 is a schematic diagram illustrating various decision tree embodiments that include multiple floating trees.

FIG. 4 illustrates some embodiments of decision trees that include more than one floating tree. For example, as shown in FIG. 4, decision tree 400 includes floating tree Y that produces results that are fed to node 402. Node 402 may separate the defects such that some defects are sent to node 404 included in the decision tree and such that other defects are sent to floating tree X. Node 404 also separates the defects such that some defects are sent to bins 406 and 408, which include 10 defects and 20 defects, respectively, while other defects are sent to floating tree X.

In another embodiment, decision tree 410 includes node 412 that is configured to separate a population of defects detected on a wafer. One subpopulation may be sent to node 414, and another subpopulation may be sent to node 416. The subpopulation of defects sent to node 414 may then be separated into defects that are sent to bins 418 and 420, which include 10 defects and 20 defects, respectively, while other defects are sent to floating tree X. In addition, the subpopulation of defects sent to node 416 may be separated into defects that are sent to floating tree Y and floating tree X.

As shown in FIG. 4, therefore, the decision trees may include more than one floating tree. The floating trees included in any of the decision trees may include more than one of the same floating tree arranged in different positions in the decision trees and two or more different floating trees arranged in different positions in the decision trees. The trees can be moved around on the UI by a user for maximum ease of use. In addition, in some instances, creating the decision tree may include creating a new floating tree and selecting a data source for the new floating tree. In this manner, floating trees may be imported or created from scratch. Furthermore, when a decision tree includes more than one floating tree, the multiple floating trees may be linked to each other by reference. The embodiments described herein also allow construction and representation of substantially complex trees very simply by removing redundancy, which is very powerful when combined with the "hide/show" tree capability described further herein. The embodiments described herein also simplify tree maintenance. In addition, the embodiments described herein may be configured to prevent circularity in the decision trees. In other words, the embodiments may be configured to prevent creation of a decision tree with a closed loop. The decision trees described herein can also be configured to provide sequential nuisance filtering.

Figure 5:
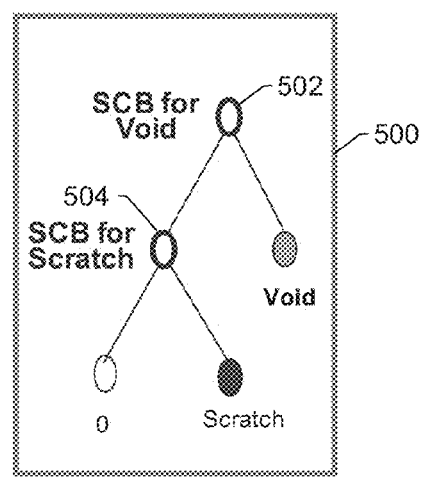
FIG. 5 is a schematic diagram illustrating one embodiment of a decision tree that includes multiple floating trees arranged in a cascaded fashion.

FIG. 5 shows an example of the steps that may be performed in constructing a complete decision tree using floating trees. For example, in one embodiment, a first of the one or more floating trees is a binner for only a first class of defects, a second of the one or more floating trees is a binner for only a second class of defects, and the decision tree is created for classification of at least the first and second classes of defects. In one such embodiment, the setup of the decision tree may include building a SCB for void type defects. In particular, a SCB may be setup as shown in FIG. 1 for separating void type defects from other types of defects. However, unlike the decision tree shown in FIG. 1, the SCB may not separate the void type defects from other defects having other specific types. In other words, instead of separating the defects into voids and scratches, the SCB may simply separate the defects into voids and other (unassigned) defect types. In a similar manner, the setup of the decision tree may include building a SCB for scratch type defects. In one such example, a SCB for scratch defects may be setup as shown in FIG. 1 for separating scratch type defects from other defect types. However, unlike the decision tree shown in FIG. 1, the SCB may not separate the scratch type defects from other defects having other specific types. In other words, instead of separating the defects into scratches and voids, the SCB may simply separate the defects into scratches and other (unassigned) defect types. The setup of the decision tree may then include attaching the two SCBs to a new classifier. For example, as shown in FIG. 5, decision tree 500 for two defect types may include SCB 502 for void type defects and SCB 504 for scratch type defects. Therefore, the SCB for void type defects may separate the defects into void defects and other defects, and the other defects may be sent to the SCB for scratch type defects, which may then separate the other defects into scratch defects and other defects.

In some embodiments, altering the one or more floating trees includes importing at least one floating tree and adjusting one or more parameters of the at least one imported floating tree to fit data for the defects detected on the wafer. For example, using the capability of floating trees, one can pre-build SCBs for common defects such as bumps and scratches, which can be readily used by any users. In addition, SCBs may be constructed for many common defect types in semiconductor manufacturing processes such as bumps and scratches for specific semiconductor processing layers. These floating trees can be referred to as out-of-box (OOB) binners. In this manner, an SCB may be saved as an OOB binner. As such, a pre-built SCB can become an OOB that is used as a starter or template to build a classifier.

In one embodiment, adjusting the one or more parameters of at least one imported floating tree includes optimizing impurity and margins of results of applying the at least one imported floating tree to the data for the defects. For example, when one imports an OOB binner to a new classifier for a new data set, the cut lines of the OOB may not work well for the new data set. In one such example, an OOB for scratch type defects may include two nodes, one for topographical height and one for size, that are used to separate scratch type defects from other defects on the wafer. Cut lines for the two nodes may be determined based on attribute histograms of training data. However, the data for a wafer other than the one used to generate the training data may be different than the training data. In that case, a method is developed that can automatically adjust the cut lines to fit the new data or a given training set by optimizing two metrics, impurity and margins, at each node of the OOB. For example, attribute histograms may be generated for the new data. The cut line(s) for the first node may be adjusted to fit the new data by determining impurity (IP(x)) and margin (M(x)) as a function of attribute value. In particular, the cut line may be set at a position that yields the best matching impurity and margin for the stored values. In addition, the cut line(s) for the second node and/or any other level 2 nodes may be adjusted as described above to fit the new data by determining impurity and margin as a function of attribute value. As such, the cut lines may be adjusted for every node included in the OOB. In this manner, the method may include automatically adapting an OOB to new wafer data.

There are different ways of combining different SCBs to form a new classifier. For example, in one embodiment, altering the one or more floating trees includes arranging the one or more floating trees in a cascaded fashion. As such, the creating step described herein may include a setup procedure for constructing a classifier by building one SCB at a time and then combining those SCBs into a complete decision tree classifier, where the SCBs are structured in a cascaded fashion. In addition, altering the one or more floating trees may include arranging the one or more floating trees in a cascaded fashion based on criticalities of classes of defects binned by the one or more floating trees, purities of classes of defects binned by the one or more floating trees, or accuracies of the one or more floating trees. In this manner, one possible way to form a new classifier is structuring floating trees in a cascaded manner and ordering the SCBs according to their criticality, which may be used to bin the more critical defects first, their purity, which may be used to minimize binning error, and their accuracy. In addition, or alternatively, the creating step described herein may include a setup procedure for constructing a classifier in a cascaded fashion where the SCBs are replaced by multi-class binners.

In this manner, a decision tree having a cascaded type arrangement may include only SCBs arranged in cascaded fashion or some combination of SCBs and multi-class binners arranged in cascaded fashion. For example, each floating tree can account for one or more defect types. Unaccounted for types in one floating tree may not be labeled and may progress to the first node of the next tree down. Accounted for types of defects are assigned the class code from that tree and do not cascade down to the next tree.

In a UI for creating a decision tree that includes floating trees in serial organization, various SCBs that can be used as OOBs may be displayed in one panel or window in the UI. All trees may be shown in this manner in a tree pane that shows the name of the tree (which may be editable), and the trees may be shown in the tree pane in one of the orders described above. For example, the trees may be shown from top to bottom in the order of criticality. A user can change the order by selecting a tree and clicking up or down arrows next to the trees. The SCBs may include SCBs for various types of defects such as bridges, particles, SEM non-visuals (SNVs), bumps, and big field of view (FOV) SNVs. In addition to SCBs, any other OOBs may be displayed in the same panel or window. The user can then view the available OOBs and perhaps scroll through them to identify ones that they want to include in a decision tree. The user can copy and paste and/or drag and drop OOBs from the panel or window into a main workspace panel or window in which the decision tree will be created. Selecting a tree in the tree panel described above may show the selected tree in the larger main workspace panel. Selecting the tree may also update the confusion matrix and gallery to reflect the selected tree. The confusion matrix for each floating tree can function in any suitable manner. The trees in the tree pane may also be selectable for editing in the larger main workspace panel. The OOBs may be used as various nodes in the decision tree, which can also include any other regular node that is created by the user.

In another embodiment, altering the one or more floating trees includes arranging the one or more floating trees in a parallel fashion. In this manner, a new classifier can be created by structuring floating trees in a parallel fashion (which may be referred to as a "forest of trees"), in which all defects are passed through all SCBs in parallel. As such, the creating step described herein may include a setup procedure for constructing a classifier by building one SCB at a time and then combining those SCBs into a complete decision tree classifier, where the SCBs are structured in a parallel fashion. In addition, or alternatively, the creating step described herein may include a setup procedure for constructing a classifier in a parallel fashion where the SCBs are replaced by multi-class binners. In this manner, a decision tree having a parallel type arrangement may include only SCBs arranged in parallel or some combination of SCBs and multi-class binners arranged in parallel. Furthermore, the creating step may include a setup procedure for constructing a classifier in a parallel ("forest of trees") fashion where the SCBs are replaced by "forest of trees" classifiers.

Arranging the floating trees in a parallel fashion provides a number of advantages over serial organization of floating trees. For example, unlike in serial organization of decision tree nodes, in a "forest of trees" arrangement, tuning the purity and/or accuracy of one node will not affect the input population of any other nodes. In addition, unlike in serial organization, none of the nodes arranged in parallel will have an insufficient defect population for training.

In one embodiment, classifying the defects as described further herein includes determining if each of the defects is binned into more than one class and when a defect is binned into more than one class, arbitrating among classes the defect is binned into to determine a final classification for the defect. In this manner, the final class for a given defect may be based on arbitrating among the classes into which it was binned. In another embodiment, the arbitrating is performed based on criticalities of the classes, purities of the classes, accuracies of the classes, sizes of bins for the classes in their training sets, a statistical measure of a number and type of the classes into which the defect was classified, or a combination thereof. In this manner, arbitrating among the classes may be performed based on their criticality, their purity, their accuracy, the size of their bins in the training set, some combination of these characteristics, or some statistical measure of the number and types of classes into which they were binned. In another embodiment, the arbitrating is performed based on priorities of the classes.

Figure 6:
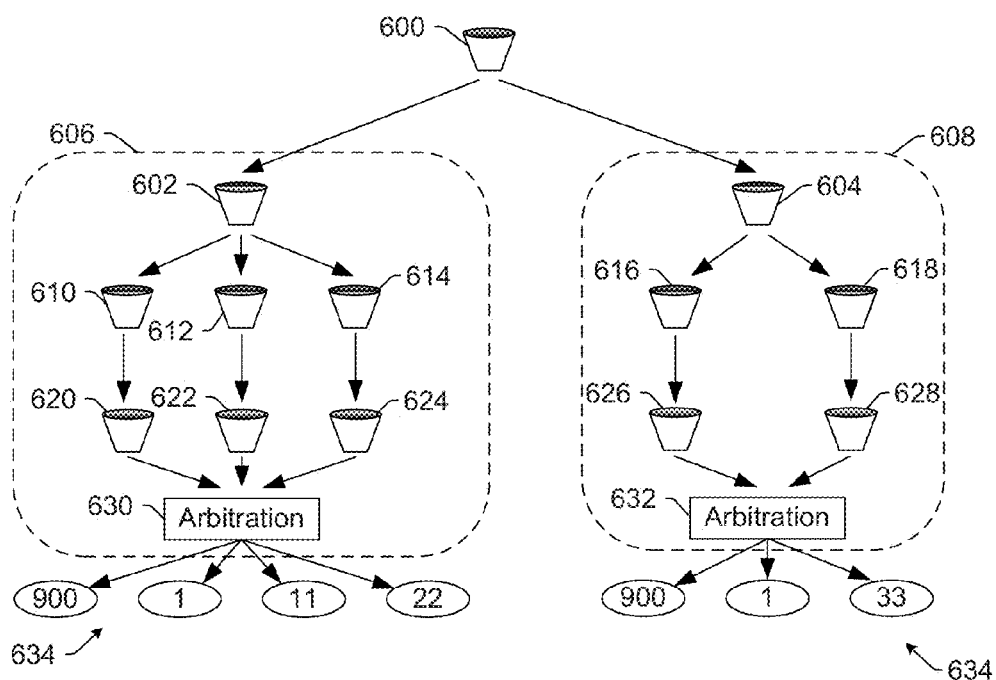
FIG. 6 is a schematic diagram illustrating one embodiment of a decision tree that includes multiple floating trees arranged in a parallel fashion.

FIG. 6 illustrates one embodiment of a "forest of trees" classifier structure in which floating trees are arranged in parallel organization. In particular, as shown in FIG. 6, the classifier includes node 600, which may be any type of node. This node may separate the defects into two bins 602 and 604. Defects in bins 602 and 604 may be processed by different forest of trees classifiers 606 and 608, respectively. In particular, defects in bin 602 may be sent to SCBs 610, 612, and 614 that are arranged in parallel with each other. In addition, defects in bin 604 may be sent to SCBs 616 and 618 that are arranged in parallel with each other. Therefore, all of the defects in bin 602 may be sent to each of the trees in forest of trees classifier 606 and all of the defects in bin 604 may be sent to each of the trees in forest of trees classifier 608. In this manner, a defect may be processed by every tree in a "forest." In some instances, the forest of trees classifiers may each include a distributor (not shown) that is configured to distribute the incoming defect population to the floating trees included in the forest of trees.

For each defect, each SCB will either bin the defect or return an unclassified bin code for the defect. In this manner, each of the SCBs in each of the forest of trees classifiers will produce a different subpopulation of defects, and any particular defect may be included in more than one subpopulation. For example, SCBs 610, 612, and 614 may produce defect subpopulations 620, 622, and 624, respectively. Any defect that is included in any one of subpopulations 620, 622, and 624 may be included in any other of these subpopulations. In addition, SCBs 616 and 618 may produce defect subpopulations 626 and 628, respectively. Any defect that is included in any one of subpopulations 626 and 628 may be included in any other of these subpopulations. As such, there may be cases where multiple trees bin a defect with conflicting bin codes. Therefore, the forest of trees classifiers shown in FIG. 6 include arbitrators that are configured to determine a final class for any defect that is included in more than one subpopulation. For example, forest of trees classifier 606 includes arbitration node 630, and forest of trees classifier 608 includes arbitration node 632. The arbitrators process the results from all the trees and resolve any conflicts. For example, the arbitrators may determine the final classification of the defects based on a priority of the classes corresponding to the SCBs in the forest of trees classifiers, and the priority may be specified by a user. In particular, if a defect is binned as several conflicting codes by several trees, the bin code with the highest "priority" wins. The priorities of the bin codes may be expressed as integers in which the highest priority may be "1" followed by "2" and so on. The bin code having the absolute lowest priority may be assigned a priority of "0." The embodiments described herein may automatically force the priority to be unique for each bin code. For example, if a user enters a priority value that already exists for another bin, the embodiments may automatically push (i.e., increment) the conflicting priorities of the other bins to make room for it. In this manner, the arbitrators may generate a number of bins 634 that include any number of defects. The bin result from the arbitrators may be returned to the client software.

A UI for creating a decision tree by arranging floating trees in parallel organization may be similar to that described above for arranging floating trees in serial organization.

The parallel organization of floating trees provides the best flexibility in handling new defect types and insulates each existing binner from each other binner. However, parallel organization of floating trees may increase the execution time of the ADC using a decision tree in which they are included compared to a decision tree having serial organization of floating trees since each defect may have to go through each SCB in a forest of trees.

For the parallel "forest of trees" classifier structure, it is possible to analyze the intermediate (pre-arbitration) results of a parallel-structured "forest of trees" classifier thereby providing a powerful classifier monitoring and quality assessment capability that does not require manual defect classification. In addition, the embodiments may use mixing between forest of tree bins and unclassified defects to monitor classifier health. For example, a population of defects may be sent through two or more SCBs in a forest of trees arrangement. The prioritization of the SCBs may be set as described herein. The embodiments may provide all class codes for each defect received, not just the arbitrated code. For example, the embodiments may provide a listing of each defect that was sent to the forest of trees and an indication of the bins into which each defect was classified. This information can be sent to other software such as Klarity, which is commercially available from KLA-Tencor. In addition, this information can be used to determine the number of defects with more than one class code and the total count of defects in any one bin that also got captured by any other bin. Such classifier monitoring is advantageous because it provides sensitive classifier monitoring without manual classification and instant feedback suggesting which bins are or may be problematic.

Creating a decision tree as described herein may also include arranging some nodes in a cascaded fashion and other nodes in a parallel fashion. For example, a decision tree may include a first node that separates a population of defects based on size of FOV (e.g., small, medium, and large). Each of the subpopulations created by this node may be sent to additional nodes. These additional nodes may separate each of the subpopulations into sub-subpopulations based on the type of pattern in which the defects are located (e.g., array and random). Each of the sub-subpopulations may then be sent to a forest of trees type classifier, each of which may be followed by arbitration logic. Therefore, the output of the arbitration logic may include the final bins of the defects.

The method also includes classifying the defects detected on the wafer by applying the decision tree to the defects. Applying the decision tree to the defects may be performed in any suitable manner. For example, once the decision trees described herein are created, the decision trees may be used in the same manner as any other decision tree. In addition, in one embodiment, classifying the defects is performed automatically. For example, the decision trees described herein may be used in any ADC method or system.

The steps of creating the decision tree and classifying the defects (and any other steps) described above may be performed by one or more computer systems, which may be configured as described further herein.

The embodiments described herein have a number of advantages over other currently used methods and systems for creating and using decision trees for semiconductor defect classification. For example, the embodiments described herein can be used to remove clutter and save real estate in the workspace of the UI for classifier construction. In addition, the embodiments provide single class classifiers that are easier to build. For example, the embodiments described herein dramatically improve ease of use by providing intuitive setups in which humans can think about one defect type at a time. In addition, setup is easier because data is less fragmented in the lower nodes. Furthermore, decision trees that are conceptually simple can actually look simple in the UI. The embodiments described herein also provide the ability to tune the purity and accuracy of the individual classes independently of other classes. Maintaining the decision trees is also easier because a user can tweak one type of defect at a time. Furthermore, the embodiments described herein provide single class classifiers that are easier to port. In addition, in the embodiments described herein, building a classifier can become the assembly of SCBs or OOB binners and structuring them in a cascaded or parallel fashion. Cascade ordering of SBCs also enables classification prioritization of different types via the explicit structure of the cascade. Parallel ordering of SBCs enables classification prioritization of different types via the use of arbitration logic. In addition, analyzing the intermediate (pre-arbitration) results of the parallel structured ("forest of trees") classifier enables a powerful classifier monitoring and quality assessment capability that does not require manual defect classification.

Each of the embodiments of the methods described above may include any other step(s) of any other method(s) described herein. Furthermore, each of the embodiments of the methods described above may be performed by any of the systems described herein.

All of the methods described herein may include storing results of one or more steps of the method embodiments in a non-transitory computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method classifies the defects, the method may include storing information about the defect classifications in a storage medium.

Figure 7:
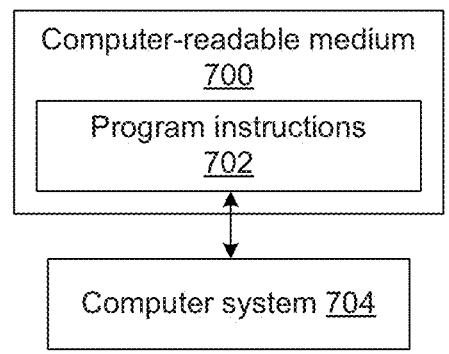
FIG. 7 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for classifying defects detected on a wafer. One such embodiment is shown in FIG. 7. In particular, as shown in FIG. 7, non-transitory computer-readable medium 700 includes program instructions 702 executable on computer system 704. The computer-implemented method includes the steps of the method described above. The computer-implemented method for which the program instructions are executable may include any other step(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), Matlab, or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or a networked tool.

Figure 8:
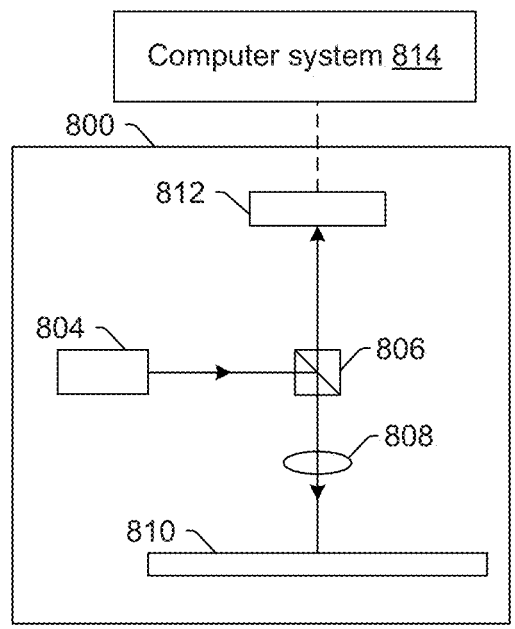
FIG. 8 is a schematic diagram illustrating a side view of one embodiment of a wafer inspection tool.

Another embodiment relates to a wafer inspection tool. One embodiment of such a tool is shown in FIG. 8. The wafer inspection tool includes an optical subsystem configured to scan at least a portion of a wafer thereby generating output responsive to light from at least the portion of the wafer. For example, as shown in FIG. 8, the wafer inspection tool includes optical subsystem 800.

As shown in FIG. 8, the optical subsystem includes light source 804. Light source 804 may include any suitable light source known in the art such as a broadband plasma light source. Light source 804 is configured to direct light to beam splitter 806, which is configured to reflect the light from light source 804 to refractive optical element 808. Refractive optical element 808 is configured to focus light from beam splitter 806 to wafer 810. Beam splitter 806 may include any suitable beam splitter such as a 50/50 beam splitter. Refractive optical element 808 may include any suitable refractive optical element, and although refractive optical element 808 is shown in FIG. 8 as a single refractive optical element, it may be replaced with one or more refractive optical elements and/or one or more reflective optical elements.

Light source 804, beam splitter 806, and refractive optical element 808 may, therefore, form an illumination channel for the optical subsystem. The illumination channel may include any other suitable elements (not shown in FIG. 8) such as one or more polarizing components and one or more filters such as spectral filters. As shown in FIG. 8, the light source, beam splitter, and refractive optical element are configured such that the light is directed to the wafer at a normal or substantially normal angle of incidence. However, the light may be directed to the wafer at any other suitable angle of incidence.

The optical subsystem may be configured to scan the light over the wafer in any suitable manner.

Light reflected from wafer 810 due to illumination may be collected by refractive optical element 808 and directed through beam splitter 806 to detector 812. Therefore, the refractive optical element, beam splitter, and detector may form a detection channel of the optical subsystem. The detector may include any suitable imaging detector known in the art such as a charge coupled device (CCD). This detection channel may also include one or more additional components (not shown in FIG. 8) such as one or more polarizing components, one or more spatial filters, one or more spectral filters, and the like. Detector 812 is configured to generate output that is responsive to the reflected light detected by the detector. The output may include signals, signal data, images, image data, and any other suitable output.

As described above, the detector included in the optical subsystem may be configured to detect light reflected from the wafer. Therefore, the detection channel included in the optical subsystem may be configured as a bright field (BF) channel. However, the optical subsystem may include one or more detection channels (not shown) that may be used to detect light scattered from the wafer due to illumination of the wafer. In addition, one or more parameters of the detection channel shown in FIG. 8 may be altered such that the detection channel detects light scattered from the wafer. In this manner, the optical subsystem may be configured as a dark field (DF) tool and/or a BF tool.

The wafer inspection tool also includes a computer subsystem coupled to the optical subsystem. For example, the computer subsystem may be coupled to a detector of the optical subsystem. In one such example, as shown in FIG. 8, computer system 814 is coupled to detector 812 of optical subsystem 800 (e.g., by one or more transmission media shown by the dashed lines in FIG. 8, which may include any suitable transmission media known in the art). The computer system may be coupled to the detector in any suitable manner. The computer system may be coupled to the optical subsystem in any other suitable manner such that image(s) and any other information for the wafer generated by the optical subsystem can be sent to the computer system and, optionally, such that the computer system can send instructions to the optical subsystem to perform one or more steps described herein.

Computer system 814 is configured for detecting defects on the wafer based on the output generated by the optical subsystem. The computer subsystem may be configured to detect the defects on the wafer in any suitable manner. The computer subsystem is also configured for creating a decision tree for classification of the defects by altering one or more floating trees in the decision tree. The one or more floating trees are sub-trees that are manipulated as individual units. In addition, the computer subsystem is configured for classifying the defects detected on the wafer by applying the decision tree to the defects. Each of these steps may be performed as described further herein. In addition, the computer subsystem may be configured to perform any other step(s) described herein. The wafer inspection tool shown in FIG. 8 may be further configured as described herein.

It is noted that FIG. 8 is provided herein to generally illustrate one configuration of an optical subsystem that may be included in the wafer inspection tool embodiments described herein. Obviously, the configuration of the optical subsystem described herein may be altered to optimize the performance of the tool as is normally performed when designing a commercial inspection tool. In addition, the wafer inspection tools described herein may be implemented using an existing optical subsystem (e.g., by adding functionality described herein to an existing inspection tool) such as the 28XX, 29XX, and Puma 9XXX series of tools that are commercially available from KLA-Tencor, Milpitas, Calif. For some such tools, the methods described herein may be provided as optional functionality of the tool (e.g., in addition to other functionality of the tool). Alternatively, the wafer inspection tools described herein may be designed "from scratch" to provide a completely new tool. Furthermore, the optical subsystem of the wafer inspection tool may be replaced with an electron beam subsystem of a defect review tool and the computer subsystem can be configured for performing the steps of the methods described herein using output generated by the electron beam subsystem, which may include, for example, electron beam images and characteristic(s) of defects detected in the electron beam images. Examples of suitable defect review tools that may be configured as described herein include the eDR7110 tools that are commercially available from KLA-Tencor.

Further modifications and alternative embodiments of various aspects of the invention will be apparent to those skilled in the art in view of this description. For example, methods and systems for decision tree construction for automatic classification of defects on semiconductor wafers are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for classifying defects detected on a wafer, comprising:

creating a decision tree for classification of defects detected on a wafer, wherein the created decision tree comprises a plurality of floating trees;

altering two or more floating trees in the plurality of floating trees in the created decision tree, wherein the two or more floating trees are manipulated as individual units, and wherein altering the two more floating trees comprises arranging the two or more floating trees in parallel with each other where at least one of the defects is passed through the two or more floating trees in parallel; and classifying the defects detected on the wafer by applying the altered and created decision tree to the defects, wherein classifying the defects comprises determining if each of the defects is binned into more than one class and when a defect is binned into more than one class, arbitrating among classes the defect is binned into to determine a final classification for the defect, wherein said creating and said classifying are performed by one or more computer systems, and wherein the one or more computer systems comprise one or more devices having one or more processors that execute instructions from a memory medium.

2. The method of claim 1, further comprising collapsing at least one of the plurality of floating trees into at least one aggregated node during said creating.

3. The method of claim 1, further comprising collapsing at least one of the plurality of floating trees into at least one aggregated node during said creating, wherein said collapsing comprises collapsing all leaf nodes included in the at least one floating tree into the at least one aggregated node.

4. The method of claim 1, wherein creating the decision tree comprises importing at least one of the plurality of floating trees from at least one file in which the at least one floating tree is saved.

5. The method of claim 1, wherein at least one of the plurality of floating trees classifies a single class of defects.

6. The method of claim 1, wherein a first of the plurality of floating trees classifies only a first class of defects, wherein a second of the plurality of floating trees classifies only a second class of defects, and wherein the decision tree is created for classification of at least the first and second classes of defects.

7. The method of claim 1, wherein creating the decision tree comprises importing at least one of the plurality of floating trees and adjusting one or more parameters of the at least one imported floating tree to fit data for the defects detected on the wafer.

8. The method of claim 7, wherein adjusting the one or more parameters of the at least one imported floating tree comprises optimizing impurity and margins of results of applying the at least one imported floating tree to the data for the defects.

9. The method of claim 1, further comprising arranging two or more other floating trees in the plurality of floating trees in the created decision tree in a cascaded fashion.

10. The method of claim 1, further comprising arranging two or more other floating trees in the plurality of floating trees in the created decision tree in a cascaded fashion based on criticalities of classes of defects binned by the two or more other floating trees.

11. The method of claim 1, further comprising arranging two or more other floating trees in the plurality of floating trees in the created decision tree in a cascaded fashion based on purities of classes of defects binned by the two or more other floating trees.

12. The method of claim 1, further comprising arranging two or more other floating trees in the plurality of floating trees in the created decision tree in a cascaded fashion based on accuracies of the two or more other floating trees.

13. The method of claim 1, wherein said arbitrating is performed based on criticalities of the classes, purities of the classes, accuracies of the classes, sizes of bins for the classes in their training sets, a statistical measure of a number and type of the classes into which the defect was classified, or a combination thereof.

14. The method of claim 1, wherein said arbitrating is performed based on priorities of the classes.

15. The method of claim 1, wherein said classifying is performed automatically.

16. A non-transitory computer-readable medium, storing program instructions executable on a computer system for performing a computer-implemented method for classifying defects detected on a wafer, wherein the computer-implemented method comprises:
   creating a decision tree for classification of defects detected on a wafer, wherein the created decision tree comprises a plurality of floating trees;
   altering two or more floating trees in the plurality of floating trees in the created decision tree, wherein the two or more floating trees are manipulated as individual units, and wherein altering the two or more floating trees comprises arranging the two or more floating trees in parallel with each other where at least one of the defects is passed through the two or more floating trees in parallel; and
   classifying the defects detected on the wafer by applying the altered and created decision tree to the defects, wherein classifying the defects comprises determining if each of the defects is binned into more than one class and when a defect is binned into more than one class, arbitrating among classes the defect is binned into to determine a final classification for the defect, and wherein said creating and said classifying are performed by one or more computer systems.

17. A wafer inspection tool, comprising:
   an optical subsystem configured to scan at least a portion of a wafer thereby generating output responsive to light from at least the portion of the wafer; and
   a computer subsystem configured for:
      detecting defects on the wafer based on the output;
      creating a decision tree for classification of the defects, wherein the created decision tree comprises a plurality of floating trees;
      altering two or more floating trees in the plurality of floating trees in the created decision tree, wherein the two or more floating trees are manipulated as individual units, and wherein altering the two or more floating trees comprises arranging the two or more floating trees in parallel with each other where at least one of the defects is passed through the two or more floating trees in parallel; and
      classifying the defects detected on the wafer by applying the altered and created decision tree to the defects, wherein classifying the defects comprises determining if each of the defects is binned into more than one class and when a defect is binned into more than one class, arbitrating among classes the defect is binned into to determine a final classification for the defect.

18. The wafer inspection tool of claim 17, wherein the computer subsystem is further configured for collapsing at least one of the plurality of floating trees into at least one aggregated node during said creating.

19. The wafer inspection tool of claim 17, wherein the computer subsystem is further configured for collapsing at least one of the plurality of floating trees into at least one aggregated node during said creating, and wherein said collapsing comprises collapsing all leaf nodes included in the at least one floating tree into the at least one aggregated node.

20. The wafer inspection tool of claim 17, wherein creating the decision tree comprises importing at least one of the plurality of floating trees from at least one file in which the at least one floating tree is saved.

21. The wafer inspection tool of claim 17, wherein at least one of the plurality of floating trees classifies a single class of defects.

22. The wafer inspection tool of claim 17, wherein a first of the plurality of floating trees classifies only a first class of defects, wherein a second of the plurality of floating trees classifies only a second class of defects, and wherein the decision tree is created for classification of at least the first and second classes of defects.

23. The wafer inspection tool of claim 17, wherein creating the decision tree comprises importing at least one of the plurality of floating trees and adjusting one or more parameters of the at least one imported floating tree to fit data for the defects detected on the wafer.

24. The wafer inspection tool of claim 23, wherein adjusting the one or more parameters of the at least one imported floating tree comprises optimizing impurity and margins of results of applying the at least one imported floating tree to the data for the defects.

25. The wafer inspection tool of claim 17, wherein the computer subsystem is further configured for arranging two or more other floating trees in the plurality of floating trees in the created decision tree in a cascaded fashion.

26. The wafer inspection tool of claim 17, wherein the computer subsystem is further configured for arranging two or more other floating trees in the plurality of floating trees in the created decision tree in a cascaded fashion based on criticalities of classes of defects binned by the two or more other floating trees.

27. The wafer inspection tool of claim 17, wherein the computer subsystem is further configured for arranging two or more other floating trees in the plurality of floating trees in the created decision tree in a cascaded fashion based on purities of classes of defects binned by the two or more other floating trees.

28. The wafer inspection tool of claim 17, wherein the computer subsystem is further configured for arranging two or more other floating trees in the plurality of floating trees in the created decision tree in a cascaded fashion based on accuracies of the two or more other floating trees.

29. The wafer inspection tool of claim 17, wherein said arbitrating is performed based on criticalities of the classes, purities of the classes, accuracies of the classes, sizes of bins for the classes in their training sets, a statistical measure of a number and type of the classes into which the defect was classified, or a combination thereof.

30. The wafer inspection tool of claim 17, wherein said arbitrating is performed based on priorities of the classes.

31. The wafer inspection tool of claim 17, wherein said classifying is performed automatically.

32. The method of claim 1, further comprising detecting the defects on the wafer based on output generated by an optical subsystem configured to scan at least a portion of the wafer, wherein the output is responsive to light from at least the portion of the wafer, and wherein the optical subsystem comprises a broadband plasma light source.

33. The wafer inspection tool of claim 17, wherein the optical subsystem comprises a broadband plasma light source.

* * * * *